United States Patent [19]

Yocum et al.

[11] Patent Number: 5,311,435
[45] Date of Patent: May 10, 1994

[54] METHOD FOR STATION KEEPING CONTROL OF FLEXIBLE SPACECRAFT USING ONBOARD GAIN SCHEDULING SCHEME

[75] Inventors: John F. Yocum; Dan Y. Liu, both of Rancho Palos Verdes, Calif.

[73] Assignee: Hughes Aircraft Company, Los Angeles, Calif.

[21] Appl. No.: 800,660

[22] Filed: Nov. 27, 1991

[51] Int. Cl.$^5$ .................. G01C 21/00; G06G 7/78
[52] U.S. Cl. .................. 364/459; 364/434; 244/164; 244/176
[58] Field of Search .............. 364/459, 434; 244/164, 244/169, 172, 176

[56] References Cited

U.S. PATENT DOCUMENTS

| | | | |
|---|---|---|---|
| 3,866,025 | 2/1975 | Cavanagh | 364/459 |
| 4,071,211 | 1/1978 | Muhlfelder et al. | 364/434 |
| 4,232,313 | 11/1980 | Fleishman | 364/453 |
| 4,456,862 | 6/1984 | Yueh | 364/453 |
| 4,492,352 | 1/1985 | Yueh | 244/3.15 |
| 4,494,202 | 1/1985 | Yueh | 364/453 |
| 4,500,950 | 2/1985 | Putman | 364/164 |
| 4,502,650 | 3/1985 | Yueh | 244/3.15 |
| 4,599,697 | 7/1986 | Chan et al. | 364/434 |
| 4,752,884 | 6/1988 | Slafer et al. | 364/434 |
| 4,791,573 | 12/1988 | Zemany et al. | 364/459 |
| 4,837,699 | 6/1989 | Smay et al. | 364/459 |
| 4,883,244 | 11/1989 | Challoner et al. | 364/459 |
| 4,961,551 | 10/1990 | Rosen . | |
| 5,058,836 | 10/1991 | Nobel | 244/176 |
| 5,100,084 | 3/1992 | Rahn et al. | 364/459 |
| 5,130,931 | 7/1992 | Paluszek et al. | 364/459 |
| 5,140,525 | 8/1992 | Shankar et al. | 364/459 |

OTHER PUBLICATIONS

Stoer, J. and Bulirsch, R., *Introduction to Numerical Analysis*, Springer-Verlag, N.Y., 1980, pp. 438–450.
Franklin, Gene F., *Feedback Control of Dynamic Systems*, 2nd ed., Addison-Wesley Publishing Co., May, 1991, pp. 497–523.

*Primary Examiner*—Jack B. Harvey
*Assistant Examiner*—Jae H. Choi
*Attorney, Agent, or Firm*—Gordon R. Lindeen, III; William J. Streeter; Wanda Denson-Low

[57] ABSTRACT

A method of attitude control for spacecraft with flexible structures utilizes an estimator/state controller pair with on-board time-varying gain scheduling. The control method includes an attitude estimator (100) for each axis, which uses rate input from inertial reference sensors (4, 5, 6) to produce estimates (37, 38, 39) of each of the state variables. The estimator employs a predictor-corrector structure which computes initial rate and position estimates for each sample interval and corrects these values by weighing them with iteratively-calculated time-varying gains according to equations 35 and 36. The state controller (40) for each axis operates on these inputs, combining them with position and rate commands (41, 42) and weighing the results with time-varying gains calculated iteratively for each sample period according to equations 46, 47, and 48. The final result is a commanded control acceleration (50) which is forwarded to a thruster modulation logic.

20 Claims, 3 Drawing Sheets

METHOD FOR STATION KEEPING CONTROL OF FLEXIBLE SPACECRAFT USING ONBOARD GAIN SCHEDULING SCHEME

BACKGROUND OF THE INVENTION

1. Field of the Invention

The invention relates to a method of attitude control for spacecraft with flexible structures, particularly to compensate for disturbances caused typically by offset between the center of pressure of spacecraft thrusters and the spacecraft center of mass.

2. Description of Related Art

An important function of a spacecraft attitude control system utilizing thrusters is compensation for thrusting disturbances about each control axis. These disturbances are primarily induced by offsets of the spacecraft's center of mass from the thrusters' center of pressure as well as thruster imperfections. Additional causes for thrusting disturbances are changes in the spacecraft's center of mass over time or possible thruster failure. These changes, which are impossible to accurately calculate in advance, render a prebias approach to attitude compensation, wherein corrections for thrusting disturbances are precalculated from known spacecraft properties and then fed in to the thruster command processors, quite difficult. The prior art has relied on either such a prebias approach or a high bandwidth control loop to compensate for the bias.

Chan, in U.S. Pat. No. 4,537,375, relies on a servo loop incorporating a prebias at the input end of the thruster modulation logic. The calculated prebias values are derived from measured values of thrusting disturbance obtained during calibration maneuvers and stored either in spacecraft memory or on the ground. Importantly, the gains in Chan's servo loop system are constant, and he ideally requires orthogonal thrusters arranged in couplets, with each thruster in the couplet being able to counteract the torque produced by the other. Furthermore, Chan's approach also requires calibration maneuvers from time to time as spacecraft mass properties change in order to obtain the values for the prebias to be stored in memory or transmitted to ground control for later use.

Bittner, in U.S. Pat. No. 4,567,564, eliminates this prebias approach and its consequent need for calibration, by using a high bandwidth observer/state controller combination for disturbance torque compensation. While this approach obviates the need for calibration maneuvers or ground input during disturbance torque compensation, Bittner's method increases the difficulty of control system design by requiring a high-enough fixed gain to converge state variables rapidly before attitude error exceeds the pointing requirement while simultaneously stabilizing spacecraft structural modes. In some systems these goals cannot be simultaneously accomplished.

Chan, in U.S. Pat. No. 4,767,084, relies on momentum/reaction wheels for attitude control during stationkeeping and thrusters for desaturation of the momentum/reaction wheels during East/West drift compensation maneuvers. This technique, however, requires a low-bandwidth wheel control loop to stabilize structural modes, thereby degrading spacecraft pointing performance. The length of Chan's desaturation maneuvers is predetermined by an autodesaturation logic which alternately fires East and West thrusters after East/West drift has been reduced to zero.

SUMMARY OF THE INVENTION

The object of the present invention is a method of compensating for disturbance torques produced during spacecraft maneuvering by any of a number of factors, including thruster center of pressure/spacecraft center of mass offset, thruster imperfections, and time-varying changes in spacecraft center of mass. The invention accomplishes this object by utilizing a set of three attitude estimators in conjunction with state controllers, all of which employ time-varying gains. The spacecraft attitude estimator employs a predictor-corrector structure to compute estimated position, body rate, and angular acceleration about each spacecraft axis. The spacecraft employs separate estimators for roll, pitch, and yaw. The estimator's correction step employs separate time varying gains $K_d$ and $K_r$ to correct the predictor's body rate estimate and generate an acceleration estimate. The state controller for each spacecraft axis relies on position, body rate, and acceleration estimates from the corresponding attitude estimator and combines these estimates with the position and body rate commanded by external software, weighing the results with scheduled time varying gains, $C_p$ for the position, $C_r$ for the body rate, and $C_d$ for the angular acceleration. The weighted attitude and rate estimates are summed, filtered and combined with the weighted angular acceleration estimate. The final result is an acceleration control command signal which is fed into the three-axis pulse width modulating logic. This modulating logic determines the commanded rate change to be applied and commands that rate change to the thruster selection and timing logic, which in turn operates the thruster output hardware, firing the thrusters.

The actual rate change commanded by the thruster selection and timing logic is fed forward to the attitude estimator to be used in initial estimate calculations for spacecraft body rate. The time-varying gains utilized are chosen to be initially high and are decreased exponentially, preferably through the use of difference equations, in order to assure rapid convergence of the estimate while minimizing spacecraft rigid-flex control interaction, so that the control thrusters will not fire in response to vehicle oscillation alone. Alternatively, the time-varying gains can be determined through curve fit or look-up tables. The invention can be better understood by reference to the following detailed description and accompanying drawings.

DESCRIPTION OF THE PREFERRED EMBODIMENTS

Figure 1A:
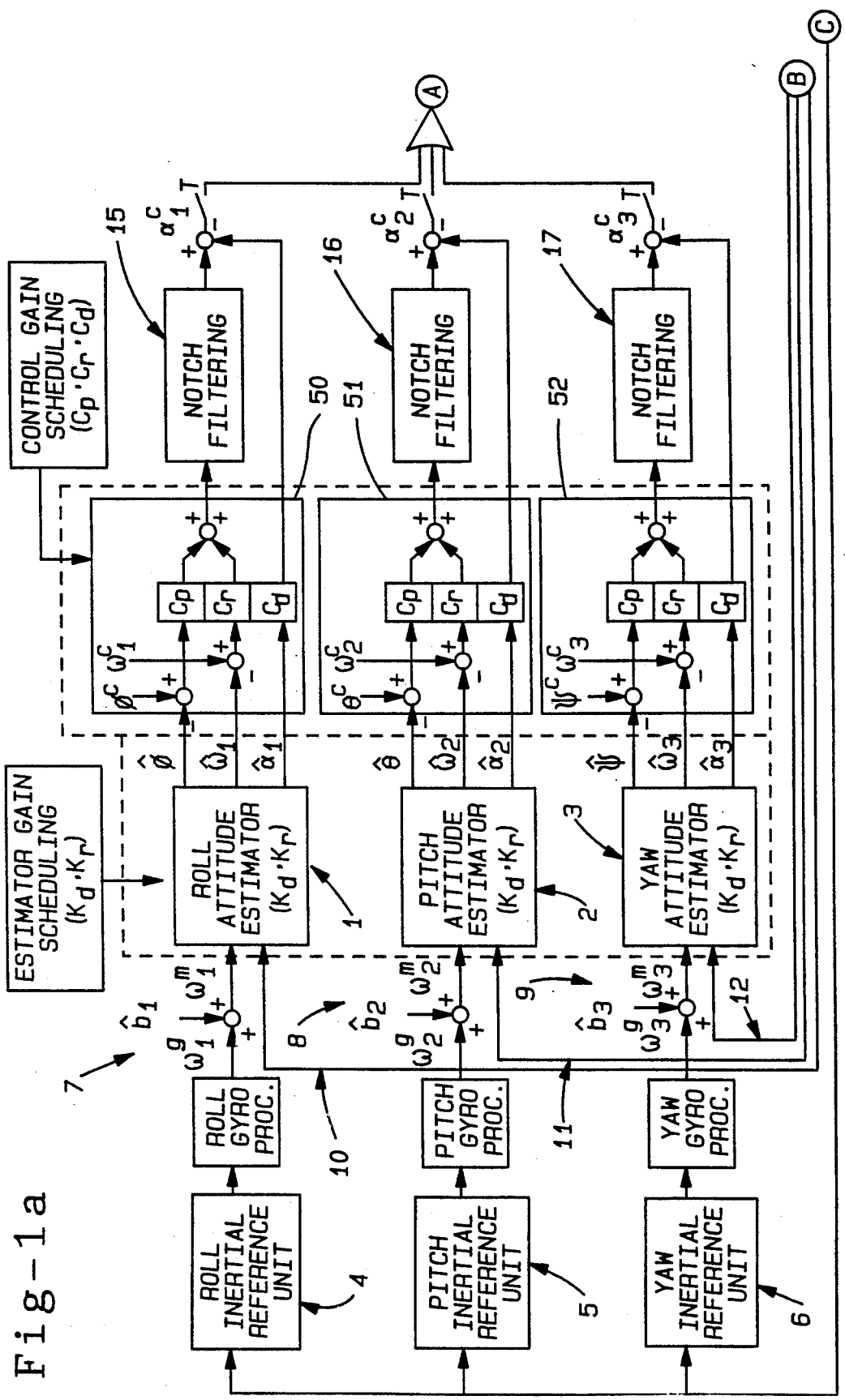
FIG. 1a is a block diagram of the three axis station keeping control system utilizing gain scheduling in accordance with the invention.

FIG. 1a illustrates the entire station-keeping control system using a gain scheduling approach according to the invention. The roll attitude estimator 1, pitch attitude estimator 2, and yaw attitude estimator 3 require inputs $\omega^g_1$, $\omega^g_2$, $\omega^g_3$, from roll, pitch and yaw inertial reference units 4, 5 and 6 respectively. These inputs are suitably filtered by bias calibration filters, whose outputs $\hat{b}_1$, $\hat{b}_2$, and $\hat{b}_3$ respectively are added at 7, 8 and 9 to the inertial reference inputs to correct for errors in the reference units' measured rates, thereby obtaining the input measured rates $\omega^m{}_1$, $\omega^m{}_2$, and $\omega^m{}_3$. An additional input to each of the estimators is the actual rate change from the previous sample interval $\Delta\omega^a$ fed forward from the thruster selection and timing logic, as indicated by lines 10, 11 and 12.

Figure 1B:
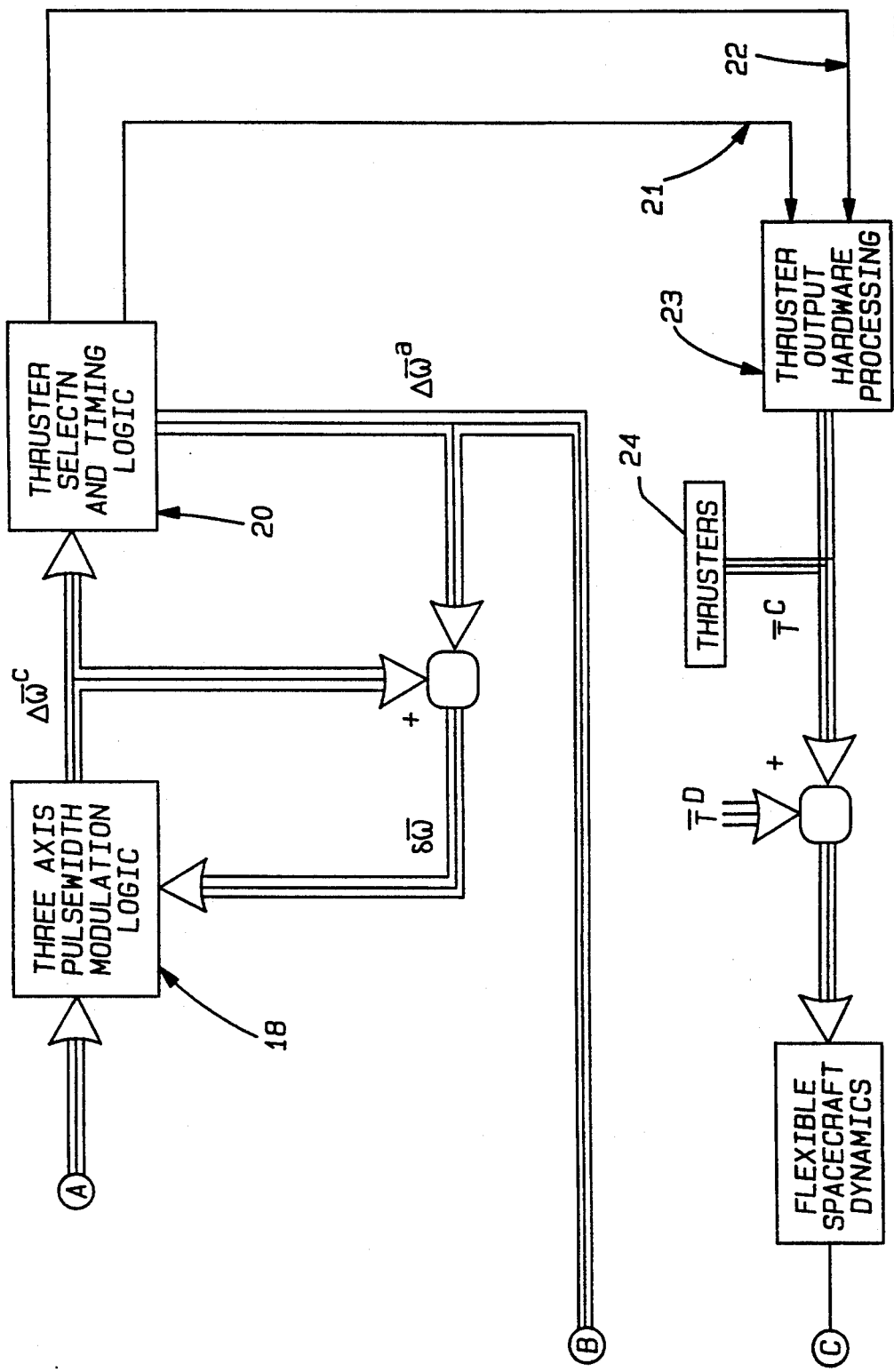
FIG. 1b is a block diagram of the thruster control apparatus with its associated feedback mechanisms.

State controllers 50, 51, and 52 operate on the estimator outputs to produce an output acceleration command $\alpha^c$, whose three components are $\alpha_1{}^c$, $\alpha_2{}^c$, and $\alpha_3{}^c$. This acceleration output is subject to notch filtering on each of the three axes as indicated by 15, 16 and 17. As shown in FIG. 1b, the final commanded acceleration signal is fed to a three axis pulse width modulation logic 18, the subject of a commonly-assigned application entitled "Three Axis Thruster Modulation", naming John Yocum, Dan Liu and Richard Fowell as inventors, the teachings of which are herewith incorporated by reference. The three axis pulse width modulation logic produces the commanded rate change $\Delta\omega^c$, which is fed to thruster selection and timing logic (TSTL) 20. The TSTL selects the appropriate thrusters to be fired as well as the thruster on/off time and sends these signals, shown by lines 21 and 22, to thruster output hardware processing 23, which commands the appropriate thrusters 24 to be fired. It is important to note that the TSTL's algorithm utilizes stored information about spacecraft mass properties, thruster placement, and thruster alignment relative to spacecraft center of gravity to predict the thrusting disturbance resulting from the desired maneuver and minimizes the resulting disturbance torque by compensating appropriately.

Since the TSTL relies on stored spacecraft properties, its approach is essentially prebias-oriented. Consequently, the TSTL's correction for disturbance torque will be imperfect since spacecraft mass properties and center of mass change over time and the TSTL has only approximate knowledge of thrust mismatch.

Figure 2:
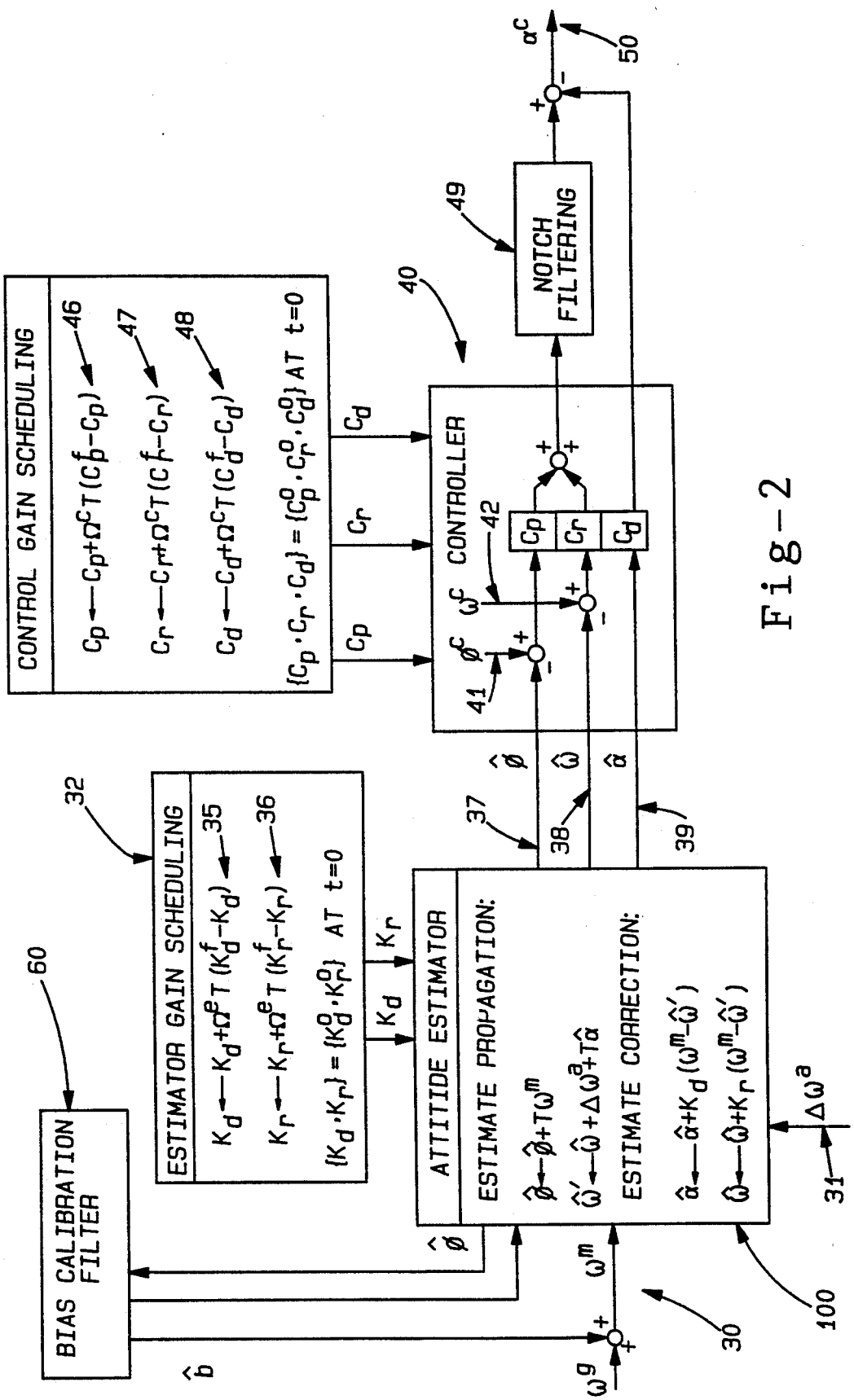
FIG. 2 is a block diagram of a portion of a control system for a given spacecraft axis in accordance with the invention.

FIG. 2 is a detailed view of one of the attitude estimators and controllers and its accompanying gain scheduling calculation apparatus. Attitude estimator 100 utilizes measured rate information $\omega^m$ from inertial reference sensors (suitably corrected for measurement error by calibration filter 60) shown by line 30, and fed-forward rate change information $\Delta\omega^a$ shown by line 31. The estimator estimates the position variable for its axis, designated by $\hat{\Phi}$, the rate variable for that axis, $\hat{\omega}$ and the angular acceleration for that axis $\hat{\alpha}$. The attitude estimator operates by iteration in time, with sample interval T. The estimator employs a predictor-corrector structure, which first calculates position $\hat{\Phi}$ by integrating it according to the relation $$\hat{\Phi}(n) = \hat{\Phi}(n-1) + T\omega^m.$$

The predictor structure then computes an initial estimate for $\hat{\omega}$, denominated $\hat{\omega}'$, using previous fed-forward rate change and acceleration information according to the relation $$\hat{\omega}'(n) = \hat{\omega}(n-1) + \Delta\omega^a + T\alpha(n-1).$$

The estimator's corrector structure utilizes gains $K_d$ and $K_r$ (calculated iteratively by estimator gain scheduling apparatus 32) to correct the acceleration and body rate estimates by weighting the difference between the estimated and measured rate $(\omega^m - \hat{\omega}')$ and combining it with the previous rate and acceleration estimates according to the relations $$\hat{\alpha}(n) = \hat{\alpha}(n-1) + K_d(\omega^m - \hat{\omega}'(n)) \text{ and}$$

$$\hat{\omega}(n) = \hat{\omega}(n-1) + K_r(\omega^m - \hat{\omega}'(n)),$$

where $\hat{\omega}'$ is the value for the estimated rate generated in the predictor step.

In the preferred embodiment, the gains $K_d$ and $K_r$ are computed according to an exponential decline by using the difference equation $$K(n) = K(n-1) + \Omega^e T(K^f - K(n-1)),$$

where K may be either $K_d$ or $K_r$. K(O) corresponds to the initial value of $K_d$ or $K_r$, $K^f$ corresponds to the final value of $K_d$ or $K_r$, and $\Omega^e$ corresponds to the inverse time constant $\Omega^e = 1/\tau$. The continuous solution to this difference equation is the exponential decline $$K(t) = K^f + (K(O) - K^f)e^{-t/\tau}.$$

The estimator gain difference equations are indicated by 35 and 36. Estimator initial and final bandwidths are determined by the choice of initial and final gain values in the estimator equations. The initial and final gain values and the time constant and sample rate, which affect the speed of gain decrement, are empirically chosen after analysis of such factors as spacecraft pointing performance requirement, structural mode stability, and transition time of the spacecraft's center of mass shift due to its motion. As an alternative to difference equations, the time varying gains can be determined in an iterative fashion through curve fit or look-up tables.

The attitude estimator feeds estimates of state variables $\hat{\Phi}$, $\hat{\omega}$, and $\hat{\alpha}$, derived from the predictor-corrector structure and indicated by lines 37, 38 and 39 to the state controller 40, which subtracts the estimated position and body rate from the commanded position $\Phi^c$ (41) and the commanded body rate $\omega^c$ (42) respectively. The residuals $(\Phi^c - \hat{\Phi})$ and $(\omega^c - \hat{\omega})$ are weighted with control gains $C_p$ and $C_r$ and these weighted residuals are summed and filtered by notch filter 49 and the acceleration $\hat{\alpha}$, suitably weighted by gain $C_d$, is subtracted from the result to produce a commanded control acceleration $\alpha^c$, indicated by line 50, according to the relation $$\alpha^c = g(C_p(\Phi^c - \hat{\Phi}) + C_r(\omega^c - \hat{\omega})) - C_d\hat{\alpha},$$

where g(1) represents the notch filtering operation. This control acceleration is forwarded to the three-axis pulsewidth modulation logic. Control gains $C_p$, $C_d$, and $C_r$ are calculated using first order difference equations in a way analogous to the calculation of estimator gains $K_d$ and $K_r$, according to the relation $$C(n) = C(n-1) + \Omega^c T(C^f - C(n-1)),$$

as indicated by lines 46, 47, and 48, where C may be either $C_p$, $C_r$, or $C_d$ and $C^f$ is the final value for either $C_p$, $C_r$, or $C_d$, and the initial values are chosen to be $C_p(O)$, $C_r(O)$, and $C_p(O)$. Again, these difference equations correspond to the continuous exponential solution $$C(t) = C^f + (C(O) - C^f)e^{-t/\tau},$$

where $\tau$ is the chosen system time constant and $\Omega^c = 1/\tau$. The initial and final values for the controller gains are chosen empirically, as are the time constants and sample rate of the difference equations, which affect the speed of gain decrementing. Important factors affecting the selection of these values are the spacecraft pointing performance requirement, structural mode stability, and transition time of the spacecraft center of mass due to propellent motion. The gains $C_p$, $C_r$, or $C_d$ can also be determined through curve fit or the use of look-up tables.

The present invention has several advantages over the prior art. The invention works for arbitrary configurations of thrusters, requires no calibration maneuvering with consequent fuel loss, and allows very precise spacecraft pointing with little structural-dynamic interaction. The present invention also ensures rapid convergence of the state variable estimates and allows application of linear analysis techniques to design of the attitude control loops for correcting for structural-dynamic interactions because of the small transition time of the estimator gains. This small transition time is achieved by using an initially high bandwidth estimator, which also minimizes initial attitude transient due to thrusting bias.

Furthermore, the preferred embodiment avoids excitation of the spacecraft structural modes by using steady state low bandwidth filtering in the attitude estimator. Because the initial high bandwidth filtering lasts only 1 to 2 periods of the dominant structural mode, it does not cause an instability problem. In the embodiment of FIG. 2, the gain scheduling equations may also be used to generate constant gain as well by setting the initial and final values for the constant gain equal to one another. Additionally, the estimator gain scheduling apparatus may also be used to generate the control gains.

The invention has been explained with reference to specific embodiments. Other embodiments will be apparent to those of ordinary skill in the art. It is, therefore, not intended that this invention be limited except as indicated by the following claims.

We claim:

1. Apparatus for compensating for thrusting disturbances in spacecraft, said spacecraft containing a plurality of thrusters commanded by thruster selection and timing logic means which determines the appropriate thrusters to be fired during a given sample period in a given maneuver and computes the duration of firing for the thrusters, said plurality of thrusters being capable of producing torques about axes of the spacecraft, said apparatus comprising:

rate sensor means for measuring the spacecraft's body rate about its axes, estimator means, responsive to signal inputs from the rate sensor means for estimating angular acceleration, body rate, and body angle of said spacecraft, said estimator means utilizing time-varying gains which decline exponentially and are determined in an iterative fashion in computing said estimated angular acceleration and body rate; and controller means for generating acceleration control commands from angular acceleration, body rate, and body angle estimates provided by said estimator means, said controller means utilizing time-varying gains which decline exponentially and are determined in an iterative fashion in computing said acceleration control commands.

2. The apparatus of claim 1 further comprising means for generating feedforward signals indicating an actual rate change commanded during a previous sample period by thruster selection and timing logic about the spacecraft's axes for use by said estimator means for estimating angular acceleration, body rate and body angle of said spacecraft.

3. The apparatus of claim 1 wherein the gains used by said estimator means are chosen for a predetermined initial value and decline to a predetermined final, lower steady-state value.

4. The apparatus of claim 1 wherein the gains used by said controller means are chosen for a predetermined initial value and decline to a final, lower steady-state value.

5. The apparatus of claim 1 wherein said controller means further comprises filter means for compensating said acceleration control signal in order to achieve stability of structural modes of said spacecraft.

6. The apparatus of claim 5, wherein said filter means comprises a notch filter.

7. The apparatus of claim 1 wherein said time-varying estimator means gains and said time-varying controller means gains are determined in an iterative fashion by use of a difference equation.

8. The apparatus of claim 7 wherein the gains used by said estimator means are calculated in an iterative fashion by use of a homogeneous first-order difference equation.

9. The apparatus of claim 7 wherein the gains used by said controller means are calculated in an iterative fashion by use of a homogeneous first-order difference equation.

10. The apparatus of claim 7 wherein the gains used by said estimator means are calculated in an iterative fashion according to the relations $$K_d(n) = K_d(n-1) + \Omega^e T(K_d^f - K_d(n-1))$$

and $$K_r(n) = K_r(n-1) + \Omega^e T(K_r^f - K_r(n-1))$$

where $K_d(n)$ represents the gain used in computing the angular acceleration estimate at the nth iteration $K_r(n)$ represents the gain used in computing the body rate estimate at the nth iteration $\Omega^e$ represents the inverse of a predetermined system time constant $K_d^f$ represents a predetermined final value for $K_d$ $K_r^f$ represents a predetermined final value for $K_r$; and T represents the chosen length of the sample period, and the resulting gains as a function of time satisfy $$K_d(t) = K_d^f + (K_d(0) - K_d^f)e^{-t/\tau} \text{ and}$$

$$K_r(t) = K_r^f + (K_r(0) - K_r^f)e^{-t/\tau}.$$

11. The apparatus of claim 7 wherein the gains used by said controller means are calculated in an iterative fashion according to the relations $$C_d(n) = C_d(n-1) + \Omega^c T(C_d^f - C_d(n-1)),$$

$$C_r(n) = C_r(n-1) + \Omega^c T(C_r^f - C_r(n-1)),$$

$$C_p(n) = C_p(n-1) + \Omega^c T(C_p^f - C_p(n-1)),$$

where
- $C_d(n)$ represents the gain applied to the angular acceleration estimate at the nth iteration
- $C_r(n)$ represents the gain applied to the body rate estimate at the nth iteration
- $C_p(n)$ represents the gain applied to the body angle estimate at the nth iteration
- $\Omega^c$ represents the inverse of the system time constant
- $C_d{}^f$ represents a predetermined final value for $C_d$
- $C_r{}^f$ represents a predetermined final value for $C_r$
- $C_p{}^f$ represents a predetermined final value for $C_p$; and
- T represents the chosen length of the sample period, and the resulting gains as a function of time satisfy $$C_d = C_d{}^f + (C_d(0) - C_d{}^f)e^{-t/\tau},$$

$$C_p = C_p{}^f + (C_p(0) - C_p{}^f)e^{-t/\tau}, \text{ and}$$

$$C_r = C_r{}^f + (C_r(0) - C_r{}^f)e^{-t/\tau}.$$

12. Apparatus for compensating for thrusting disturbances in spacecraft during stationkeeping operations, said spacecraft containing a plurality of thrusters commanded by thruster selection and timing logic means which determine the appropriate thrusters to be fired during a given sample period in a given maneuver and computes the duration of firing for the thrusters, said plurality of thrusters being capable of producing torques about each axis of the spacecraft, said apparatus comprising:
- rate sensor means for measuring the spacecraft's body rate about each of its three axes,
- means for generating feedforward signals indicating the actual rate change commanded during the previous sample period by the thruster selection and timing logic about each of the spacecraft's axes,
- estimator means, responsive to signal inputs from the spacecraft rate sensors and feedforward signals from the thruster selection and timing logic, for estimating disturbance torque, body rate, and body angle of said spacecraft, said estimator means using calculated time-varying gains calculated iteratively according to the relations $$K_d(n) = K_d(n-1) + \Omega^e T(K_d{}^f - K_d(n-1))$$

and $$K_r(n) = K_r(n-1) + \Omega^e T(K_r{}^f - K_r(n-1))$$

where
- $K_d(n)$ represents the gain used in computing the angular acceleration estimate at the nth iteration
- $K_r(n)$ represents the gain used in computing the body rate estimate at the nth iteration
- $\Omega^e$ represents the inverse of a predetermined system time constant
- $K_d{}^f$ represents a predetermined final value for $K_d$
- $K_r{}^f$ represents a predetermined final value for $K_r$; and
- T represents the chosen length of the sample period, and the resulting gains as a function of time satisfy $$K_d(t) = K_d{}^f + (K_d(0) - k_d{}^f)e^{-t/\tau}$$

and $$K_r(t) = K_r{}^f + (K_r(0) - K_r{}^f)e^{-t/\tau},$$

where $\tau$ and $\Omega^e$ are related by $\Omega^e = 1/\tau$, resulting in rapid convergence of said rate and disturbance estimates and obviating the need for spacecraft prebias maneuvering while maintaining stability of the structural modes of said spacecraft; and
- controller means for generating acceleration control commands from disturbance torque, body rate, and body angle values provided by said estimator means, said controller means using calculated time-varying gains calculated in an iterative fashion according to the relations $$C_d(n) = C_d(n-1) + \Omega^c T(C_d{}^f - C_d(n-1)),$$

$$C_r(n) = C_r(n-1) + \Omega^c T(C_r{}^f - C_r(n-1)),$$

$$C_p(n) = C_p(n-1) + \Omega^c T(C_p{}^f - C_p(n-1)),$$

where
- $C_d(n)$ represents the gain applied to the angular acceleration estimate at the nth iteration
- $C_r(n)$ represents the gain applied to the body rate estimate at the nth iteration
- $C_p(n)$ represents the gain applied to the body angle estimate at the nth iteration
- $\Omega^c$ represents the inverse of the system time constant
- $C_d{}^f$ represents a predetermined final value for $C_d$
- $C_r{}^f$ represents a predetermined final value for $C_r$
- $C_p{}^f$ represents a predetermined final value for $C_p$; and
- T represents the chosen length of the sample period, and the resulting gains as a function of time satisfy $$C_d = C_d{}^f + (C_d(0) - C_d{}^f)e^{-t/\tau},$$

$$C_p = C_p{}^f + (C_p(0) - C_p{}^f)e^{-t/\tau}, \text{ and}$$

$$C_r = C_r{}^f + (C_r(0) - C_r{}^f)e^{-t/\tau},$$

where $\tau$ and $\Omega^c$ are related by $\Omega^c = 1/\tau$, resulting in rapid convergence of said acceleration control estimate and obviating the need for prebias maneuvering, said controller means further comprising notch filter means for compensating said acceleration control signal in order to achieve stability of the structural modes of said spacecraft.

13. A method for compensating for thrusting disturbances in a spacecraft having a plurality of thrusters for producing torques about the axes of the spacecraft, the method comprising:
- measuring the spacecraft's body rate about each of its axes,
- estimating the angular acceleration, the body rate, and the body angle of said spacecraft based on the body rate measurements, using time-varying gains which decline exponentially and are determined in an iterative fashion;
- generating acceleration control commands from the angular acceleration, the body rate, and the body angle estimates using time-varying gains which decline exponentially and are determined in an iterative fashion;
- determining the appropriate thruster to be fired and the appropriate duration of the firing using the acceleration control commands; and
- firing the determined thrusters based on the determination.

14. The method of claim 13 further comprising the step of generating feedforward signals indicating an actual body rate change commanded during a previous sample period about the spacecraft's axes for use in the step of estimating the angular acceleration, the body rate and the body angle of the spacecraft.

15. The method of claim 13 wherein the step of estimating comprises calculating the gains in an iterative fashion by use of a homogenous first-order difference equation.

16. The method of claim 13 wherein the step of generating comprises calculating the gains in an iterative fashion by use of a homogenous first-order difference equation.

17. The method of any one of claim 13 wherein the step of estimating comprises calculating the gains in an iterative fashion according to the relations $$K_d(n) = K_d(n-1) + \Omega^e T(K_d^f - K_d(n-1)) \text{ and}$$

$$K_r(n) = K_r(n-1) + \Omega^e T(K_r^f - K_r(n-1))$$

where
- $K_d(n)$ represents the gain used in computing the angular acceleration estimate at the nth iteration,
- $K_r(n)$ represents the gain used in computing the body rate estimate at the nth iteration
- $\Omega^e$ represents the inverse of a predetermined system time constant
- $K_d^f$ represents a predetermined final value for $K_d$
- $K_r^f$ represents a predetermined final value for $K_r$; and
- T represents the chosen length of the sample period, and the resulting gains as a function of time which satisfy $$K_d(t) = K_d^f + (K_d(0) - K_d^f)e^{-t/\tau} \text{ and}$$

$$K_r(t) = K_r^f + (K_r(0) - K_r^f)e^{-t/\tau}.$$

18. The method of claim 13 wherein the step of generating comprises calculating the gains in an iterative fashion according to the relations $$C_d(n) = C_d(n-1) + \Omega^c T(C_d^f - C_d(n-1)),$$

$$C_r(n) = C_r(n-1) + \Omega^c T(C_r^f - C_r(n-1)),$$

$$C_p(n) = C_p(n-1) + \Omega^c T(C_p^f - C_p(n-1)),$$

where
- $C_d(n)$ represents the gain applied to the angular acceleration estimate at the nth iteration
- $C_r(n)$ represents the gain applied to the body rate estimate at the nth iteration
- $C_p(n)$ represents the gain applied to the body angle estimate at the nth iteration
- $\Omega^c$ represents the inverse of the system time constant
- $C_d^f$ represents a predetermined final value for $C_d$
- $C_r^f$ represents a predetermined final value for $C_r$
- $C_p^f$ represents a predetermined final value for $C_p$; and
- T represents the chosen length of the sample period, and the resulting gains as a function of time satisfy $$C_d = C_d^f + (C_d(0) - C_d^f)e^{-t/\tau},$$

$$C_p = C_p^f + (C_p(0) - C_p^f)e^{-t/\tau}, \text{ and}$$

$$C_r = C_r^f + (C_r(0) - C_r^f)e^{-t/\tau}.$$

19. The method of claim 13 further comprising the step of compensating the acceleration control signal in order to achieve stability of structural modes of the spacecraft.

20. The method of claim 19, wherein the step of compensating comprises using a notch filter.

* * * * *